United States Patent
Chan et al.

(10) Patent No.: US 12,085,829 B2
(45) Date of Patent: Sep. 10, 2024

(54) METHODS FOR DRIVING ELECTRO-OPTIC DISPLAYS

(71) Applicant: E INK CORPORATION, BILLERICA, MA (US)

(72) Inventors: Bryan Hans Chan, San Francisco, CA (US); Craig Lin, Fremont, CA (US)

(73) Assignee: E INK CORPORATION, Billerica, MA (US)

(*) Notice: Subject to any disclaimer, the term of this patent is extended or adjusted under 35 U.S.C. 154(b) by 0 days.

(21) Appl. No.: 18/148,546

(22) Filed: Dec. 30, 2022

(65) Prior Publication Data

US 2023/0213832 A1      Jul. 6, 2023

Related U.S. Application Data

(60) Provisional application No. 63/295,492, filed on Dec. 30, 2021.

(51) Int. Cl.
    *G02F 1/166*    (2019.01)

(52) U.S. Cl.
    CPC .................... *G02F 1/166* (2019.01)

(58) Field of Classification Search
    CPC ........ G02F 1/166; G09G 5/395; G09G 5/397; G09G 3/344; G09G 5/393; G09G 2360/18; G09G 2310/0224; G09G 2310/0227; G09G 2310/0218; G09G 2320/0252
    See application file for complete search history.

(56) References Cited

U.S. PATENT DOCUMENTS

| | | |
|---|---|---|
| 4,418,346 A | 11/1983 | Batchelder |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson |
| 6,054,071 A | 4/2000 | Mikkelsen, Jr. |
| 6,055,091 A | 4/2000 | Sheridon |

(Continued)

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.

(Continued)

*Primary Examiner* — Doon Y Chow
(74) *Attorney, Agent, or Firm* — Jason P. Colangelo

(57) ABSTRACT

A method for driving electro-optic displays including a layer of electro-optic material disposed between a common electrode and a backplane including an array of pixel electrodes, each coupled to a pixel transistor. The method for driving includes apportioning a displayable region of the electro-optic display into N BRAID line groups, where each of the N BRAID line groups is associated with a frame buffer. The method also includes receiving first image data comprising optical state data for the entire displayable region of the electro-optic display, and sequentially writing subsets of the first image data to each of the N frame buffers, wherein each of the N frame buffers is written with data corresponding to the corresponding BRAID line group. The method also includes sequentially updating portions of the displayable region of the electro-optic display based on the data in each of the N frame buffers.

10 Claims, 7 Drawing Sheets

(56) References Cited

U.S. PATENT DOCUMENTS

| | | | |
|---|---|---|---|
| 6,097,531 | A | 8/2000 | Sheridon |
| 6,128,124 | A | 10/2000 | Silverman |
| 6,130,774 | A | 10/2000 | Albert et al. |
| 6,137,467 | A | 10/2000 | Sheridon |
| 6,144,361 | A | 11/2000 | Gordon, II |
| 6,147,791 | A | 11/2000 | Sheridon |
| 6,172,798 | B1 | 1/2001 | Albert et al. |
| 6,184,856 | B1 | 2/2001 | Gordon, II |
| 6,225,971 | B1 | 5/2001 | Gordon, II |
| 6,241,921 | B1 | 6/2001 | Jacobson et al. |
| 6,271,823 | B1 | 8/2001 | Gordon, II |
| 6,301,038 | B1 | 10/2001 | Fitzmaurice |
| 6,445,489 | B1 | 9/2002 | Jacobson et al. |
| 6,504,524 | B1 | 1/2003 | Gates et al. |
| 6,512,354 | B2 | 1/2003 | Jacobson et al. |
| 6,531,997 | B1 | 3/2003 | Gates et al. |
| 6,672,921 | B1 | 1/2004 | Liang et al. |
| 6,753,999 | B2 | 6/2004 | Zehner et al. |
| 6,788,449 | B2 | 9/2004 | Liang et al. |
| 6,825,970 | B2 | 11/2004 | Goenaga et al. |
| 6,866,760 | B2 | 3/2005 | Paolini, Jr. et al. |
| 6,870,657 | B1 | 3/2005 | Fitzmaurice |
| 6,900,851 | B2 | 5/2005 | Morrison et al. |
| 6,922,276 | B2 | 7/2005 | Zhang et al. |
| 6,950,220 | B2 | 9/2005 | Abramson et al. |
| 6,982,178 | B2 | 1/2006 | LeCain et al. |
| 6,995,550 | B2 | 2/2006 | Jacobson et al. |
| 7,002,728 | B2 | 2/2006 | Pullen et al. |
| 7,012,600 | B2 | 3/2006 | Zehner et al. |
| 7,023,420 | B2 | 4/2006 | Comiskey et al. |
| 7,034,783 | B2 | 4/2006 | Gates et al. |
| 7,061,166 | B2 | 6/2006 | Kuniyasu |
| 7,061,662 | B2 | 6/2006 | Chung et al. |
| 7,075,502 | B1 | 7/2006 | Drzaic et al. |
| 7,116,318 | B2 | 10/2006 | Amundson et al. |
| 7,116,466 | B2 | 10/2006 | Whitesides et al. |
| 7,119,772 | B2 | 10/2006 | Amundson et al. |
| 7,170,670 | B2 | 1/2007 | Webber |
| 7,177,066 | B2 | 2/2007 | Chung et al. |
| 7,193,625 | B2 | 3/2007 | Danner et al. |
| 7,202,847 | B2 | 4/2007 | Gates |
| 7,236,291 | B2 | 6/2007 | Kaga et al. |
| 7,242,514 | B2 | 7/2007 | Chung et al. |
| 7,259,744 | B2 | 8/2007 | Arango et al. |
| 7,304,787 | B2 | 12/2007 | Whitesides et al. |
| 7,312,784 | B2 | 12/2007 | Baucom et al. |
| 7,312,794 | B2 | 12/2007 | Zehner et al. |
| 7,321,459 | B2 | 1/2008 | Masuda |
| 7,327,511 | B2 | 2/2008 | Whitesides et al. |
| 7,339,715 | B2 | 3/2008 | Webber et al. |
| 7,408,699 | B2 | 8/2008 | Wang et al. |
| 7,411,719 | B2 | 8/2008 | Paolini, Jr. et al. |
| 7,420,549 | B2 | 9/2008 | Jacobson et al. |
| 7,453,445 | B2 | 11/2008 | Amundson |
| 7,492,339 | B2 | 2/2009 | Amundson |
| 7,528,822 | B2 | 5/2009 | Amundson et al. |
| 7,535,624 | B2 | 5/2009 | Amundson et al. |
| 7,545,358 | B2 | 6/2009 | Gates et al. |
| 7,583,251 | B2 | 9/2009 | Arango et al. |
| 7,602,374 | B2 | 10/2009 | Zehner et al. |
| 7,612,760 | B2 | 11/2009 | Kawai |
| 7,679,599 | B2 | 3/2010 | Kawai |
| 7,679,813 | B2 | 3/2010 | Liang et al. |
| 7,679,814 | B2 | 3/2010 | Paolini, Jr. et al. |
| 7,683,606 | B2 | 3/2010 | Kang et al. |
| 7,688,297 | B2 | 3/2010 | Zehner et al. |
| 7,729,039 | B2 | 6/2010 | LeCain et al. |
| 7,733,311 | B2 | 6/2010 | Amundson et al. |
| 7,733,335 | B2 | 6/2010 | Zehner et al. |
| 7,787,169 | B2 | 8/2010 | Abramson et al. |
| 7,839,564 | B2 | 11/2010 | Whitesides et al. |
| 7,859,742 | B1 | 12/2010 | Chiu et al. |
| 7,952,557 | B2 | 5/2011 | Amundson |
| 7,956,841 | B2 | 6/2011 | Albert et al. |
| 7,982,479 | B2 | 7/2011 | Wang et al. |
| 7,999,787 | B2 | 8/2011 | Amundson et al. |
| 8,009,348 | B2 | 8/2011 | Zehner et al. |
| 8,077,141 | B2 | 12/2011 | Duthaler et al. |
| 8,125,501 | B2 | 2/2012 | Amundson et al. |
| 8,139,050 | B2 | 3/2012 | Jacobson et al. |
| 8,174,490 | B2 | 5/2012 | Whitesides et al. |
| 8,243,013 | B1 | 8/2012 | Sprague et al. |
| 8,274,472 | B1 | 9/2012 | Wang et al. |
| 8,289,250 | B2 | 10/2012 | Zehner et al. |
| 8,300,006 | B2 | 10/2012 | Zhou et al. |
| 8,305,341 | B2 | 11/2012 | Arango et al. |
| 8,314,784 | B2 | 11/2012 | Ohkami et al. |
| 8,319,759 | B2 | 11/2012 | Jacobson et al. |
| 8,373,649 | B2 | 2/2013 | Low et al. |
| 8,384,658 | B2 | 2/2013 | Albert et al. |
| 8,456,414 | B2 | 6/2013 | Lin et al. |
| 8,462,102 | B2 | 6/2013 | Wong et al. |
| 8,514,168 | B2 | 8/2013 | Chung et al. |
| 8,537,105 | B2 | 9/2013 | Chiu et al. |
| 8,558,783 | B2 | 10/2013 | Wilcox et al. |
| 8,558,785 | B2 | 10/2013 | Zehner et al. |
| 8,558,786 | B2 | 10/2013 | Lin |
| 8,558,855 | B2 | 10/2013 | Sprague et al. |
| 8,576,164 | B2 | 11/2013 | Sprague et al. |
| 8,576,259 | B2 | 11/2013 | Lin et al. |
| 8,593,396 | B2 | 11/2013 | Amundson et al. |
| 8,605,032 | B2 | 12/2013 | Liu et al. |
| 8,643,595 | B2 | 2/2014 | Chung et al. |
| 8,665,206 | B2 | 3/2014 | Lin et al. |
| 8,681,191 | B2 | 3/2014 | Yang et al. |
| 8,730,153 | B2 | 5/2014 | Sprague et al. |
| 8,810,525 | B2 | 8/2014 | Sprague |
| 8,928,562 | B2 | 1/2015 | Gates et al. |
| 8,928,641 | B2 | 1/2015 | Chiu et al. |
| 8,976,444 | B2 | 3/2015 | Zhang et al. |
| 9,013,394 | B2 | 4/2015 | Lin |
| 9,019,197 | B2 | 4/2015 | Lin |
| 9,019,198 | B2 | 4/2015 | Lin et al. |
| 9,019,318 | B2 | 4/2015 | Sprague et al. |
| 9,082,352 | B2 | 7/2015 | Cheng et al. |
| 9,171,508 | B2 | 10/2015 | Sprague et al. |
| 9,218,773 | B2 | 12/2015 | Sun et al. |
| 9,224,338 | B2 | 12/2015 | Chan et al. |
| 9,224,342 | B2 | 12/2015 | Sprague et al. |
| 9,224,344 | B2 | 12/2015 | Chung et al. |
| 9,230,492 | B2 | 1/2016 | Harrington et al. |
| 9,251,736 | B2 | 2/2016 | Lin et al. |
| 9,262,973 | B2 | 2/2016 | Wu et al. |
| 9,269,311 | B2 | 2/2016 | Amundson |
| 9,299,294 | B2 | 3/2016 | Lin et al. |
| 9,373,289 | B2 | 6/2016 | Sprague et al. |
| 9,390,066 | B2 | 7/2016 | Smith |
| 9,390,661 | B2 | 7/2016 | Chiu et al. |
| 9,412,314 | B2 | 8/2016 | Amundson et al. |
| 9,460,666 | B2 | 10/2016 | Sprague et al. |
| 9,495,918 | B2 | 11/2016 | Harrington et al. |
| 9,501,981 | B2 | 11/2016 | Lin et al. |
| 9,513,743 | B2 | 12/2016 | Sjodin et al. |
| 9,514,667 | B2 | 12/2016 | Lin |
| 9,542,895 | B2 | 1/2017 | Gates et al. |
| 9,564,088 | B2 | 2/2017 | Wilcox et al. |
| 9,612,502 | B2 | 4/2017 | Danner et al. |
| 9,620,048 | B2 | 4/2017 | Sim et al. |
| 9,620,067 | B2 | 4/2017 | Harrington et al. |
| 9,672,766 | B2 | 6/2017 | Sjodin |
| 9,691,333 | B2 | 6/2017 | Cheng et al. |
| 9,721,495 | B2 | 8/2017 | Harrington et al. |
| 9,792,861 | B2 | 10/2017 | Chang et al. |
| 9,792,862 | B2 | 10/2017 | Hung et al. |
| 9,966,018 | B2 | 5/2018 | Gates et al. |
| 10,043,459 | B1 | 8/2018 | De Greef |
| 10,229,641 | B2 | 3/2019 | Yang et al. |
| 10,319,313 | B2 | 6/2019 | Harris et al. |
| 10,339,876 | B2 | 7/2019 | Lin et al. |
| 10,672,350 | B2 | 6/2020 | Amundson et al. |
| 11,520,202 | B2 | 12/2022 | Paydavosi et al. |
| 2003/0102858 | A1 | 6/2003 | Jacobson et al. |
| 2004/0246562 | A1 | 12/2004 | Chung et al. |
| 2005/0253777 | A1 | 11/2005 | Zehner et al. |

(56) References Cited

U.S. PATENT DOCUMENTS

| | | | |
|---|---|---|---|
| 2007/0008250 A1* | 1/2007 | Hoppenbrouwers | G09G 3/3225 345/76 |
| 2007/0091418 A1 | 4/2007 | Danner et al. | |
| 2007/0103427 A1 | 5/2007 | Zhou et al. | |
| 2007/0176912 A1 | 8/2007 | Beames et al. | |
| 2008/0024429 A1 | 1/2008 | Zehner | |
| 2008/0024482 A1 | 1/2008 | Gates et al. | |
| 2008/0136774 A1 | 6/2008 | Harris et al. | |
| 2008/0303780 A1 | 12/2008 | Sprague et al. | |
| 2009/0174651 A1 | 7/2009 | Jacobson et al. | |
| 2009/0322721 A1 | 12/2009 | Zehner et al. | |
| 2010/0007673 A1* | 1/2010 | Swic | G09G 5/001 345/539 |
| 2010/0194733 A1 | 8/2010 | Lin et al. | |
| 2010/0194789 A1 | 8/2010 | Lin et al. | |
| 2010/0220121 A1 | 9/2010 | Zehner et al. | |
| 2010/0265561 A1 | 10/2010 | Gates et al. | |
| 2011/0063314 A1 | 3/2011 | Chiu et al. | |
| 2011/0175875 A1 | 7/2011 | Lin et al. | |
| 2011/0193840 A1 | 8/2011 | Amundson et al. | |
| 2011/0193841 A1 | 8/2011 | Amundson et al. | |
| 2011/0199671 A1 | 8/2011 | Amundson et al. | |
| 2011/0221740 A1 | 9/2011 | Yang et al. | |
| 2012/0001957 A1 | 1/2012 | Liu et al. | |
| 2012/0098740 A1 | 4/2012 | Chiu et al. | |
| 2013/0063333 A1 | 3/2013 | Arango et al. | |
| 2013/0249782 A1 | 9/2013 | Wu et al. | |
| 2014/0009817 A1 | 1/2014 | Wilcox et al. | |
| 2014/0204012 A1 | 7/2014 | Wu et al. | |
| 2014/0240210 A1 | 8/2014 | Wu et al. | |
| 2014/0253425 A1 | 9/2014 | Zalesky et al. | |
| 2014/0293398 A1 | 10/2014 | Wang et al. | |
| 2015/0262255 A1 | 9/2015 | Khajehnouri et al. | |
| 2016/0140910 A1 | 5/2016 | Amundson | |
| 2016/0180777 A1 | 6/2016 | Lin et al. | |

OTHER PUBLICATIONS

Wood, D., "An Electrochromic Renaissance?" Information Display, 18(3), 24 (Mar. 2002) Mar. 1, 2002.

Bach, Udo et al., "Nanomaterials-Based Electrochromics for Paper-Quality Displays", Adv. Mater, vol. 14, No. 11, pp. 845-8, (Jun. 5, 2002). Jun. 5, 2002.

Hayes, R.A. et al., "Video-Speed Electronic Paper Based on Electrowetting", Nature, vol. 425, No. 25, pp. 383-385 (Sep. 2003). Sep. 25, 2003.

Kitamura, T. et al., "Electrical toner movement for electronic paper-like display", Asia Display/IDW '01, pp. 1517-1520, Paper HCS1-1 (2001). 2001.

Yamaguchi, Y. et al., "Toner display using insulative particles charged triboelectrically", Asia Display/IDW '01, pp. 1729-1730, Paper AMD4-4 (2001). 2001.

European Patent Office, "International Search Report and Written Opinion", PCT/US2022/054314, Mar. 14, 2023. Mar. 14, 2023.

* cited by examiner

Example: Three BRAID pattern
Effectively triples the frame rate

Example: Two BRAID pattern
Effectively doubles the frame rate

| Num BRAID Lines | Total Update Time |
|---|---|
| 1 (standard update) | 750 ms |
| 2 | 500 ms |
| 3 | 417 ms |
| 4 | 375 ms |
| 5 | 350 ms |

Example is based on DU mode updates of 250ms

FIG. 6

METHODS FOR DRIVING ELECTRO-OPTIC DISPLAYS

CROSS-REFERENCE TO RELATED APPLICATIONS

This application claims priority to U.S. Provisional Patent Application No. 63/295,492 filed on Dec. 30, 2021, the entire contents of which are incorporated herein by reference. Further, the entire contents of any patent, published application, or other published work referenced herein are incorporated by reference in their entireties.

FIELD OF THE INVENTION

The subject matter presented herein is directed to driving methods for electro-optic display devices. Specifically, the subject matter presented herein is directed to driving methods for electrophoretic displays.

BACKGROUND OF THE INVENTION

In driving electro-optic displays, normally the driving software is synchronized to the display's frame rate, meaning, anything written to memory shows up during the next frame update. Using liquid crystal display ("LCD") technology as an example, a first image A written to an LCD display's image memory is not presented on the display until the next frame update, at which time a subsequent image B can be written to the display's image memory (but not yet presented on the display). Subsequent images are written to and presented on the display in the same manner according to the display's frame rate.

Electrophoretic displays or EPDs can be updated in the manner of LCD displays with the display controller's CPU being prevented or blocked from writing more than one image to the image memory during each frame, and only presenting each subsequent image at a frame update.

Driving an EPD using this method can be simple to implement from a software perspective, however, it is limited by the frame rate of the display. The time required to update an EPD may be too long in duration to be able to effectively present images of a video using some driving schemes or modes common to EPDs. For example, an EPD being driven using a direct update driving scheme can in some cases be limited to a frame rate of four frames per second which can result in a noticeable lack of video quality.

SUMMARY OF THE INVENTION

As such, there is a need for driving methods for EPDs that reduce the image update time, especially for sequential images such as video content.

Accordingly, in one aspect, the subject matter presented herein provides for a method for driving an electro-optic display that includes a layer of electro-optic material disposed between a common electrode and a backplane. The backplane includes an array of pixel electrodes, where each pixel electrode is coupled to a pixel transistor, and where a display controller circuit applies waveforms to the array of pixel electrodes by applying one or more time-dependent voltages between the common electrode and the array of pixel electrodes via the pixel transistors. The method for driving includes apportioning a displayable region of the electro-optic display into N BRAID line groups, where each of the N BRAID line groups is associated with a frame buffer, and receiving first image data comprising optical state data for the entire displayable region of the electro-optic display. The method for driving also includes sequentially writing subsets of the first image data to each of the N frame buffers, where each of the N frame buffers is written with data corresponding to the corresponding BRAID line group, and sequentially updating portions of the displayable region of the electro-optic display based on the data in each of the N frame buffers.

In some embodiments, each of the N BRAID line groups corresponds to a plurality of rows of display pixels from the array of pixel electrodes. In some embodiments, the method for driving includes selecting a drive scheme for updating the displayable region of the electro-optic display. In some embodiments, the drive scheme selected for updating the displayable region of the electro-optic display is a direct update drive scheme.

In some embodiments, the first image data has an image size, and each of the N frame buffers comprises sufficient memory to store a portion of the first image data corresponding to the image size divided by N.

In some embodiments, the method for driving further includes receiving second image data comprising optical state data for the entire displayable region of the electro-optic display, and sequentially writing subsets of the second image data to each of the N frame buffers, where each of the N frame buffers is written with data corresponding to the corresponding BRAID line group, and where the subsets of the first image data in each of the N frame buffers is overwritten by the subsets of the second image data after the portion of the displayable region is updated based on the subsets of the first image data in each of the N frame buffers. The method for driving also includes sequentially updating portions of the displayable region of the electro-optic display based on the subsets of the second image data in each of the N frame buffers.

In some embodiments, the displayable region of the electro-optic display is apportioned into two BRAID line groups. In some embodiments, the displayable region of the electro-optic display is apportioned into three BRAID line groups.

In some embodiments, the method for driving further includes updating the displayable region of the electro-optic display using a driving scheme configured to remove image artifacts after updating the displayable region of the electro-optic display based on last image data. In some embodiments, the method for driving further includes dithering the first image data to convert the image data to 1-bit image data.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 6 illustrates difference in update time when using different BRAID lines in accordance with the subject matter presented herein.

DETAILED DESCRIPTION OF THE INVENTION

Figure 2:
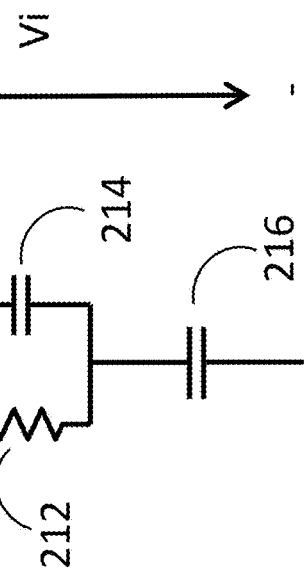
FIG. 2 illustrates an equivalent circuit representing the electro-optic display illustrated in FIG. 1.

The present invention relates to methods for updating images in electro-optic displays, especially bistable electro-optic displays, and to apparatuses for use in such methods. More specifically, this invention relates to driving methods and apparatuses (e.g., display controllers) that enable expedited updating of electro-optic displays. This invention is especially, but not exclusively, intended for use with particle-based electrophoretic displays in which one or more types of electrically charged particles are present in a fluid and are moved through the fluid under the influence of an electric field to change the appearance of the display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to herein describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

Much of the discussion below will focus on methods for driving one or more pixels of an electro-optic display through a transition from an initial gray level (or "graytone") to a final gray level (which may or may not be different from the initial gray level). The terms "gray state," "gray level" and "graytone" are used interchangeably herein and include the extreme optical states as well as the intermediate gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses." The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728; and 7,679,814;

(b) Capsules, binders and encapsulation processes; see for example U.S. Pat. Nos. 6,922,276; and 7,411,719;

(c) Films and sub-assemblies containing electro-optic materials; see for example U.S. Pat. Nos. 6,982,178; and 7,839,564;

(d) Backplanes, adhesive layers and other auxiliary layers and methods used in displays; see for example U.S. Pat. Nos. 7,116,318; and 7,535,624;

(e) Color formation and color adjustment; see for example U.S. Pat. No. 7,075,502; and U.S. Patent Application Publication No. 2007/0109219;

(f) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0070032; 2007/0076289; 2007/0091418; 2007/0103427; 2007/0176912; 2007/0296452; 2008/0024429; 2008/0024482; 2008/0136774; 2008/0169821; 2008/0218471; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2016/0071465; 2016/0078820; 2016/0093253; 2016/0140910; and 2016/0180777;

(g) Applications of displays; see for example U.S. Pat. No. 7,312,784; and U.S. Patent Application Publication No. 2006/0279527; and (h) Non-electrophoretic displays, as described in U.S. Pat. Nos. 6,241,921; 6,950,220; and 7,420,549; and U.S. Patent Application Publication No. 2009/0046082.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display." In a microcell electrophoretic display, the charged particles and the suspending fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media may be opaque (since, for example, in many electrophoretic media, the particles substantially block transmission of visible light through the display) and operate in a reflective mode, some electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal displays. Twisted nematic liquid crystals are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

A high-resolution display may include individual pixels which are addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. When the non-linear element is a transistor, the pixel electrode may be connected to the drain of the transistor, and this arrangement will be assumed in the following description, although it is essentially arbitrary and the pixel electrode could be connected to the source of the transistor. In high resolution arrays, the pixels may be arranged in a two-dimensional array of rows and columns, such that any specific pixel may be uniquely defined by the intersection of one specified row and one specified column. The sources of all the transistors in each column may be connected to a single column electrode, while the gates of all the transistors in each row are connected to a single row electrode. The assignment of sources to rows and gates to columns may be reversed if desired.

The display may be written in a row-by-row manner. The row electrodes are connected to a row driver, which may apply to a selected row electrode a voltage such as to ensure that all the transistors in the selected row are conductive, while applying to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display. As in known in the art, voltage is relative and a measure of a charge differential between two points. One voltage value is relative to another voltage value. For example, zero voltage ("0V") refers to having no voltage differential relative to another voltage.) After a pre-selected interval known as the "line address time" a selected row is deselected, another row is selected, and the voltages on the column drivers are changed so that the next line of the display is written. This process can be repeated so that the entire display is written in a row-by-row manner.

In some applications, an EPD may make use of a "direct update" drive scheme ("DUDS" or "DU"). The DU drive scheme may have two or more than two gray levels, typically less than a gray scale drive scheme ("GSDS), which can effect transitions between all possible gray levels. But the most important characteristic of a DU scheme is that transitions are handled by a unidirectional drive from the initial gray level to the final gray level, as opposed to the "indirect" transitions often used in a GSDS, where in at least some transitions the pixel is driven from an initial gray level to one extreme optical state, then in the reverse direction to a final gray level. In some cases, the transition may be effected by driving from the initial gray level to one extreme optical state, then to the opposed extreme optical state, and only then to the final extreme optical state-see, for example, the drive scheme illustrated in FIGS. 11A and 11B of the aforementioned U.S. Pat. No. 7,012,600. Thus, present electrophoretic displays may have an update time in grayscale mode of about two to three times the length of a saturation pulse (where "the length of a saturation pulse" is defined as the time period, at a specific voltage, that suffices to drive a pixel of an EPD from one extreme optical state to the other), or approximately 700-900 milliseconds, whereas a DU scheme can have a maximum update time equal to the length of the saturation pulse, or about 200-300 milliseconds, and typically around 250 ms.

It should be appreciated that even though the various embodiments presented below use electrophoretic materials with micro-cells to illustrate the working principles in accordance with the subject matter presented herein, the same principles may be adopted for electrophoretic materials with micro-capsulized particles (e.g., pigment particles). Electrophoretic material with micro-cells are used herein for illustration and not to serve as a limitation.

Figure 1:
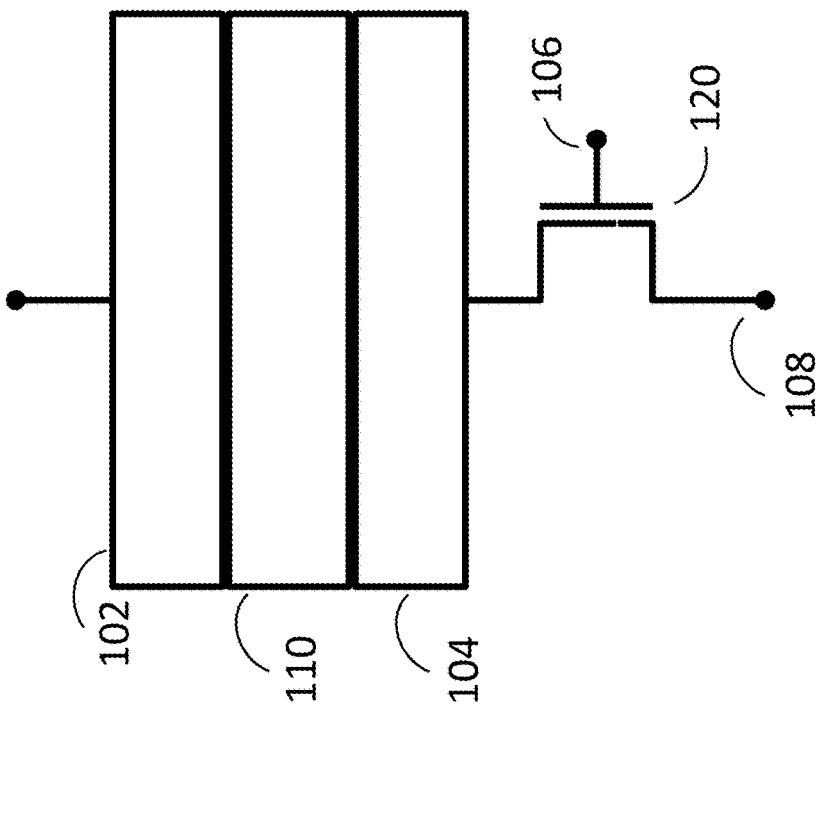
FIG. 1 illustrates a schematic representation of an electro-optic display in accordance with the subject matter presented herein.

FIG. 1 illustrates a schematic model of a display pixel 100 of an electrophoretic display or EPD in accordance with the subject matter presented herein. Pixel 100 can include an imaging film 110. In some embodiments, imaging film 110 is a layer of electrophoretic material and bistable in nature. This electrophoretic material can include a plurality of electrically charged color pigment particles (e.g., black, white, yellow or red) disposed in a fluid and capable of moving through the fluid under the influence of an electric field. In some embodiments, imaging film 110 is an electrophoretic film having micro-cells with charged pigment particles. In some other embodiments, imaging film 110 includes, without limitation, an encapsulated electrophoretic imaging film, which can itself include, for example, charged pigment particles.

In some embodiments, imaging film 110 is be disposed between a front electrode 102 and a rear or pixel electrode 104. Front electrode 102 can be formed between the imaging film and the front of the display. In some embodiments, front electrode 102 is transparent and light-transmissive. In some embodiments, front electrode 102 is formed of any suitable transparent material, including, without limitation, indium tin oxide (ITO). Rear electrode 104 can be formed on an opposed side of the imaging film 110 to the front electrode 102. In some embodiments, a parasitic capacitance (not shown) is formed between front electrode 102 and rear electrode 104.

Pixel 100 can be one of a plurality of pixels. The plurality of pixels can be arranged in a two-dimensional array of rows and columns to form a matrix, such that any specific pixel is uniquely defined by the intersection of one specified row and one specified column. In some embodiments, the matrix of pixels is an "active matrix," in which each pixel is associated with at least one non-linear circuit element 120. The non-linear circuit element 120 can be coupled between back-plate electrode 104 and an addressing electrode 108. In some embodiments, non-linear element 120 is a diode and/or a transistor, including, without limitation, a MOSFET or a Thin-Film Transistor (TFT). The drain (or source) of the MOSFET or TFT can be coupled to back-plate or pixel electrode 104, the source (or drain) of the MOSFET or TFT can be coupled to the addressing electrode 108, and the gate of the MOSFET or TFT can be coupled to a driver electrode 106 configured to control the activation and deactivation of the MOSFET or TFT. (For simplicity, the terminal of the MOSFET or TFT coupled to back-plate electrode 104 will be referred to as the MOSFET or TFT's drain, and the terminal of the MOSFET or TFT coupled to addressing electrode 108 will be referred to as the MOSFET or TFT's source. However, one of ordinary skill in the art will recognize that, in some embodiments, the source and drain of the MOSFET or TFT can be interchanged.)

In some embodiments of the active matrix, the addressing electrodes 108 of all the pixels in each column are connected to a same column electrode, and the driver electrodes 106 of all the pixels in each row are connected to a same row electrode. The row electrodes can be connected to a row driver, which can select one or more rows of pixels by applying to the selected row electrodes a voltage sufficient to activate the non-linear elements 120 of all the pixels 100 in the selected row(s). The column electrodes can be connected to column drivers, which can place upon the addressing electrode 106 of a selected (activated) pixel a voltage suitable for driving the pixel into a desired optical state. The voltage applied to an addressing electrode 108 can be relative to the voltage applied to the pixel's front-plate electrode 102 (e.g., a voltage of approximately zero volts). In some embodiments, the front-plate electrodes 102 of all the pixels in the active matrix is coupled to a common electrode.

In use, the pixels 100 of the active matrix can be written in a row-by-row manner. For example, a row of pixels can be selected by the row driver, and the voltages corresponding to the desired optical states for the row of pixels can be applied to the pixels by the column drivers. After a preselected interval known as the "line address time," the selected row can be deselected, another row can be selected, and the voltages on the column drivers can be changed so that another line of the display is written.

FIG. 2 shows a circuit model of the electro-optic imaging layer 110 disposed between the front electrode 102 and the rear electrode 104 in accordance with the subject matter presented herein. Resistor 202 and capacitor 204 can represent the resistance and capacitance of the electro-optic imaging layer 110, the front electrode 102 and the rear electrode 104, including any adhesive layers. Resistor 212 and capacitor 214 can represent the resistance and capacitance of a lamination adhesive layer. Capacitor 216 can represent a capacitance that may form between the front electrode 102 and the back electrode 104, for example, interfacial contact areas between layers, such as the interface between the imaging layer and the lamination adhesive layer and/or between the lamination adhesive layer and the back-plane electrode. A voltage Vi across a pixel's imaging film 110 can include the pixel's remnant voltage.

The update time for a conventional EPD employing a direct update driving mode or scheme is typically about 250 ms. Accordingly, updating an EPD with three images (e.g., Images A, B, and C) in succession using an LCD-like update scheme and a DU driving mode requires (250 ms×3) or 750 ms to complete. As a result, an EPD can be limited to a frame rate of four frames per second ("FPS") which can a noticeable lack of video quality.

Figure 3:
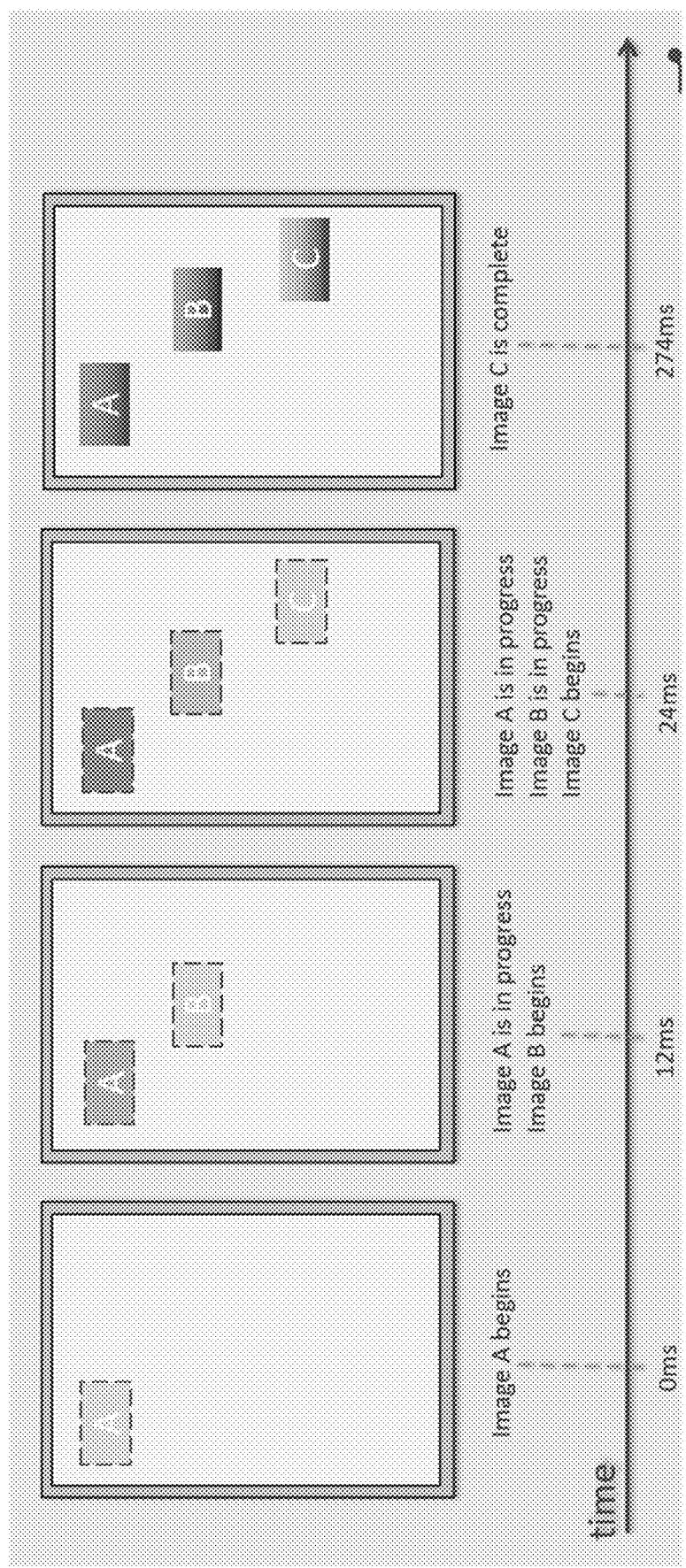
FIG. 3 illustrates a pipelined update method in accordance with the subject matter presented herein.

FIG. 3 illustrates a pipelined update method in accordance with the subject matter presented herein. Using the pipelined update method described herein, image data can be pipelined by an EPD's display controller to perform incremental updates, as illustrated in FIG. 3.

Advantageously, pipelining the image data enables the display controller to write to the frame or image memory while a prior image is still being updated to the display screen, thereby overlapping some portions of the image updating process, and reducing the overall update time. For example, as illustrated in FIG. 3, for a display operating at 85 Hz, a first image, Image A, begins its update at the 0ms mark, and finishes updating at the 250 ms mark, as dictated by the DU driving mode. Subsequently, around the 12 ms mark, a second image, Image B, begins its incremental update while Image A's update is still in progress. Image B finishes updating around the 262 ms mark (not shown in FIG. 3). Similarly, a third image, Image C, can commence its update at the 24 ms mark, while images A and B are also updating. Finally, Image C finishes updating at the 274 ms mark.

In this fashion, all three of Images A, B, and C can finish updating and being presented on the display in 274 ms, as compared to the 750 ms required if there was no pipelining of the image data. This updating scheme can make it possible for EPDs to perform fast updates, which is useful for applications that take pen input, or for animation that does not have overlapping areas from one image to the next.

Figure 4B:
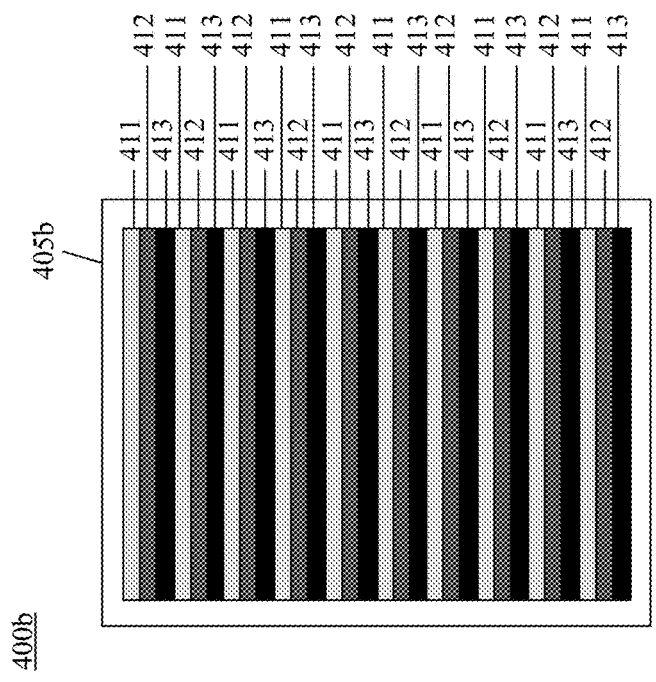
FIGS. 4A and 4B illustrate two exemplary BRAID driving methods in accordance with the subject matter presented herein.
Figure 4A:
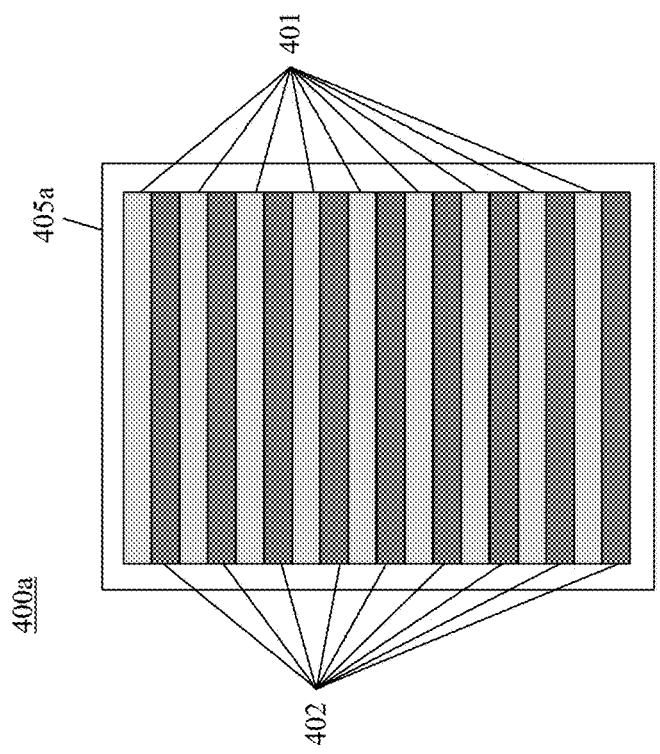

FIG. 4A and FIG. 4B each show exemplary diagrams of displays apportioned according to another drive scheme referred to as the Brisk Refresh Advanced Interlacing Design or "BRAID" drive scheme. Using a BRAID drive scheme, the area of a display can be apportioned into multiple sets or groups of alternating lines that are updated at different times. For example, FIG. 4A shows a diagram 400a of a display 405a apportioned into two groups (e.g., group 401 and group 402) of alternating BRAID lines, and FIG. 4B shows a diagram 400b of a display 405b apportioned into three groups (e.g., group 411, group 412, and group 413) of alternating BRAID lines.

As described below in more detail, this scheme enables image data from multiple images to be pipelined, and can significantly reduce the overall update time. For example, apportioning the area of the display into two groups of alternating lines as in FIG. 4A can effectively double the rate at which an EPD can be updated with images. Similarly, apportioning the area of the display into three groups of alternating lines as in FIG. 4B can effectively triple the rate at which an EPD can be updated with images.

It can be inferred from these examples that by using a BRAID driving scheme, the image update rate or frame rate can be calculated as [Waveform Time÷Number of BRAID Line Groups] where "waveform time" refers to the time required to update an EPD with an image. In the example described above for a conventional EPD employing a direct update driving scheme, the waveform time is typically about 250 ms.

Figure 5:
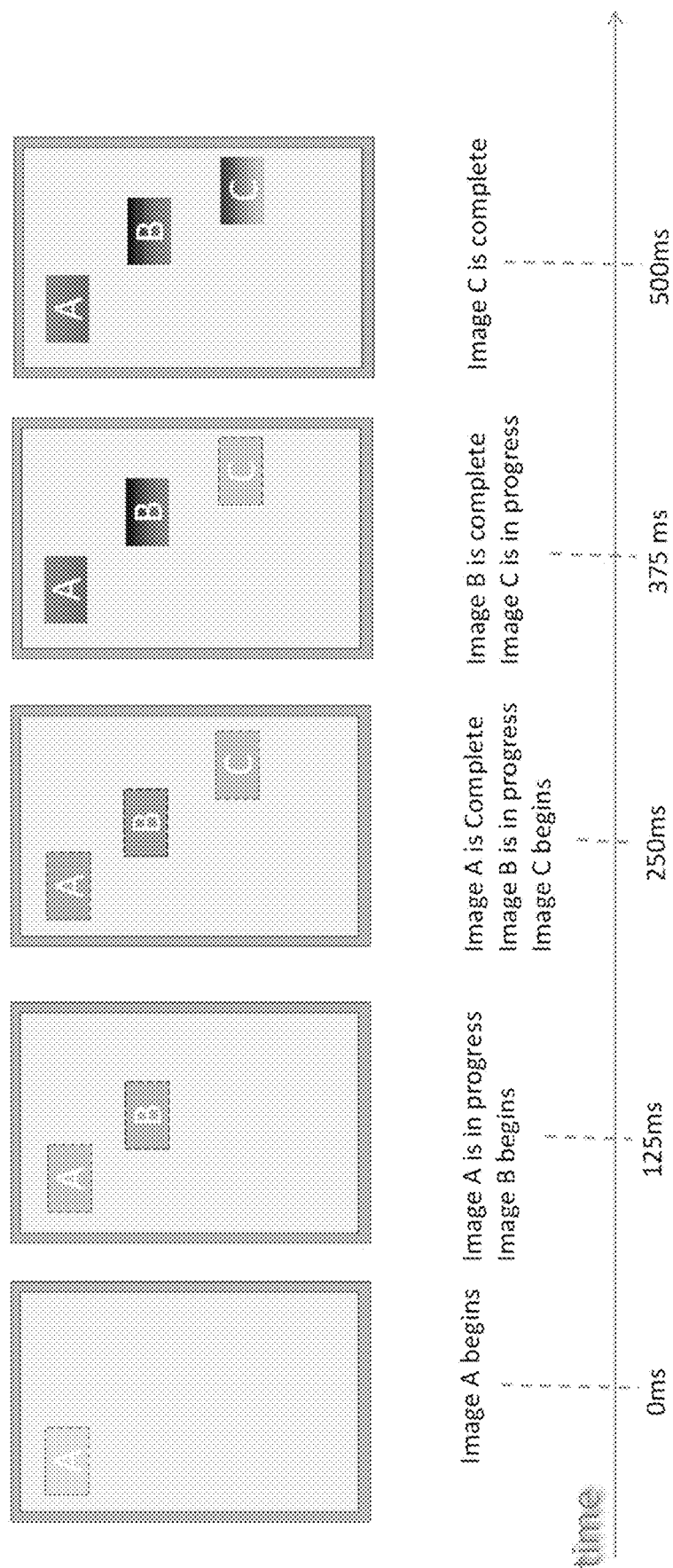
FIG. 5 illustrates a BRAID driving method using two BRAID lines in accordance with the subject matter presented herein.

As explained above, updating a conventional EPD with three images (e.g., Images A, B, and C) in succession using an LCD-like update scheme and a DU driving mode requires (250 ms×3) or 750 ms to complete. FIG. 5 illustrates a BRAID driving method using two groups of BRAID lines in accordance with the subject matter presented herein. As illustrated in FIG. 5, using the BRAID method with the display apportioned into two groups of BRAID lines, the update time for each image after Image A can be reduced to 125 ms. Further, pipelining the image data using the BRAID method can reduce the overall update time for all three of Images A, B, and C to finish updating and being presented on the display to 500 ms, as compared to the 750 ms required if there was no pipelining of the image data.

For example, as illustrated in FIG. 5, for a display operating at 85 Hz, a first image, Image A, begins its update at the 0ms mark. Subsequently, around the 125 ms mark, a second image, Image B, begins its incremental update while Image A's update is still in progress. Image A and finishes updating at the 250 ms mark, as dictated by the DU drive scheme, while Image B continues to be incrementally updated. In addition, a third image, Image C, commences its update at the 250 ms mark. Image B finishes updating around the 375 ms mark while Image C continues to be incrementally updated. Finally, Image C finishes updating at the 500 ms mark.

Accordingly, using the BRAID method, all three of Images A, B, and C can finish updating and being presented on the display in 500 ms, as compared to the 750 ms required if there was no pipelining of the image data. This updating scheme can make it possible for EPDs to perform fast updates, which is useful for applications that take pen input, or for animation that does not have overlapping areas from one image to the next.

FIG. 6 shows a table 600 listing the total update time for a display to be updated with three images using the BRAID update method and DU driving scheme. It can be inferred that increasing the number of groups of BRAID lines can further reduce the overall update time. For example, as indicated in FIG. 6, using the BRAID method with the display apportioned into two groups of BRAID lines as in the example of FIG. 5, the total update time is reduced to 500 ms. The total update time can be further reduced using additional groups of BRAID lines. For example, using the BRAID method with the display apportioned into three groups of BRAID lines reduces the total update time to 417 ms, four groups of BRAID lines reduces the total update time to 375 ms, and five groups of BRAID lines reduces the total update time to 350 ms. One of skill in the art will appreciate that additional reductions in the total update time can be achieved by apportioning the display into more groups of BRAID lines.

Figure 7:
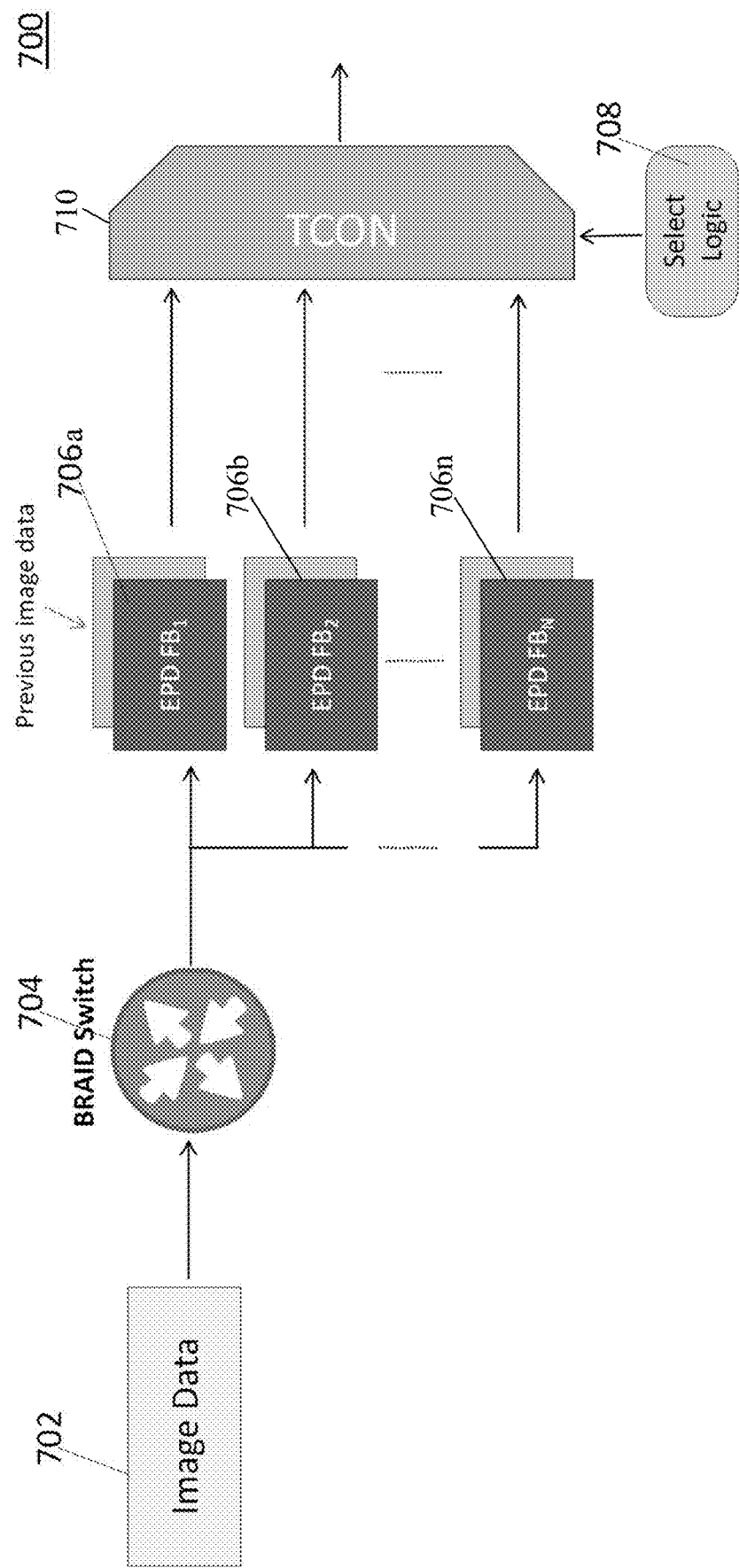
FIG. 7 illustrates an exemplary BRAID driving system in accordance with the subject matter presented herein.

FIG. 7 is a block diagram of an exemplary BRAID system 700 in accordance with the subject matter presented herein. BRAID system 700 includes image data 702 which can be a series of images or video data supplied by a host controller or other digital media source. BRAID system 700 also includes a BRAID Switch 704, a plurality of EPD frame buffers 706, and select logic 708 for choosing which of the outputs from the EPD frame buffers 706 gets sent to TCON 710 which is the display's control logic for controlling the gate and source lines for driving the matrix of TFTs.

In operation, image data 702 is sent to the BRAID Switch 704 at a fixed rate according the number of BRAID groups. For example, the images can be sent at an image update rate or frame rate that can be calculated as [Waveform Time÷Number of BRAID Line Groups] where "waveform time" refers to the time required to update an EPD with an image.

The BRAID Switch 704 can include sufficient memory resources to store at least one complete image, and can be overwritten each frame. Each of the EPD frame buffers 706 can include sufficient memory resources to store at least the image data corresponding to one BRAID line group. In some embodiments, the size of each of the EPD frame buffers 706 can be determined by [Total size of Image÷Number of BRAID Line Groups]. Further, the number of EPD frame buffers 706 can correspond to the number of BRAID line groups. For example, in a system using three BRAID line groups, there can be three EPD frame buffers 706.

The BRAID Switch 704 can be configured to write the image data corresponding to one of the BRAID line groups to one of the EPD frame buffers 706. The image data written by the BRAID Switch 704 includes a subset of the total image data, i.e., only the image data needed to display the portion of the image that would be displayed at each BRAID line of a particular group. For example, using FIG. 4B as a reference for the BRAID line groups, the BRAID Switch 704 can write image data corresponding to BRAID line group 411 to EPD frame buffer 706a. Continuing the example, the BRAID Switch 704 then advances a counter or pointer and writes the image data corresponding to BRAID line group 412 to EPD frame buffer 706b. The BRAID Switch 704 continues receiving and writing image data in this fashion at fixed rate corresponding the frame rate described above.

Once the BRAID Switch 704 has written to the last EPD frame buffer 706 (e.g., EPD frame buffer 706n), its counter wraps around and begins again writing to the first EPD frame buffer 706 (e.g., EPD frame buffer 706a) which will include image data from a subsequent image.

The select logic 708 operates at the same rate as the BRAID Switch 704 and selects which EPD frame buffer 706 output to send to TCON 710 which in turn updates the corresponding BRAID line group on the display with the image data. The process continues until the last image of the video is reached.

Figure 8:
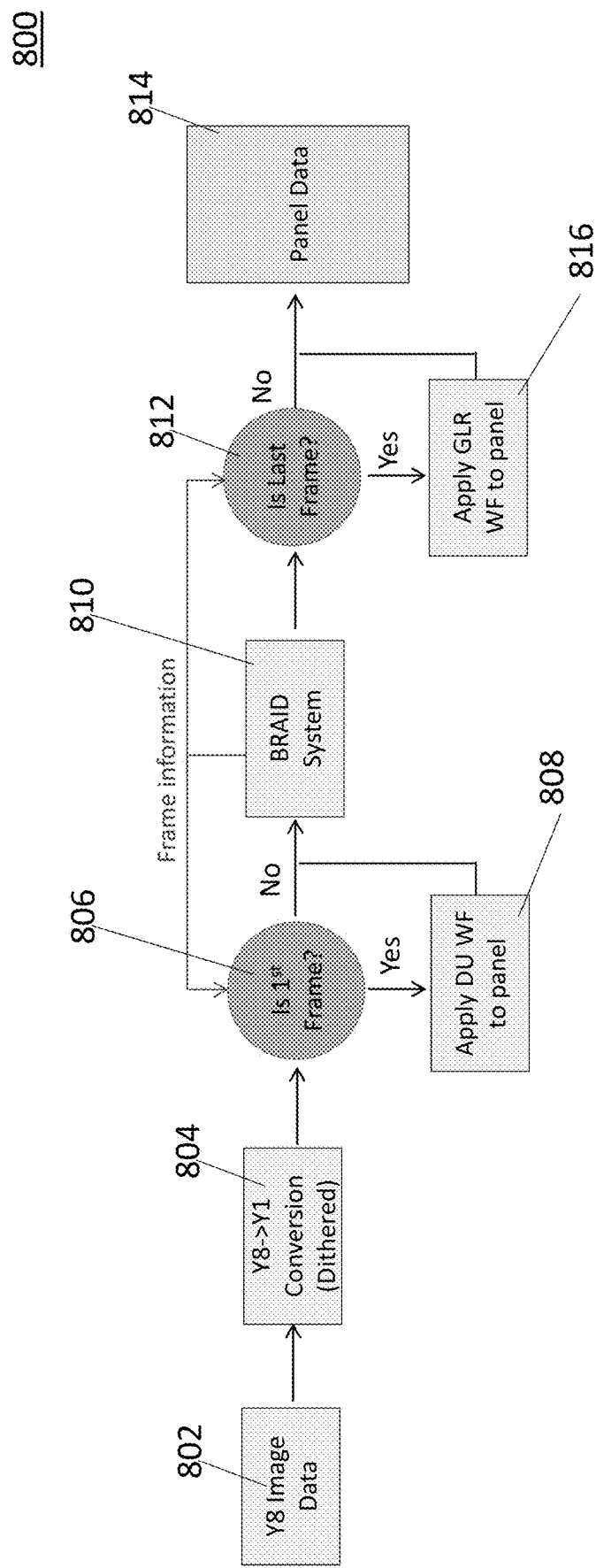
FIG. 8 shows an exemplary flow chart illustrating the BRAID update method in accordance with the subject matter presented herein.

FIG. 8 shows an exemplary flow chart 800 illustrating the BRAID update method. In this example, an 8-bit grayscale image is provided at Y8 image data 802. The image data from Y8 image data 802 can optionally be converted to a black and white 1-bit image by Y8->Y1 conversion 804. In some embodiments, Y8->Y1 conversion 804 uses a dithering algorithm to convert the image data provided by Y8 image data 802. In some embodiments, a data Floyd-Steinberg routine or a blue noise mask algorithm are used.

At step 806 it is determined whether the image data provided by Y8->Y1 conversion 804 is the first image in a series of images or video based on frame information provided by the BRAID system step 810. In some embodiments, the BRAID system step 810 obtains the frame information from a host controller or from information embedded in the image data. If the image data is the first image in a series of images, the process proceeds to step 808 where a driving mode (e.g., DU drive scheme) can be used to update the entire display with the first image (e.g., Image A from the example in FIG. 5) and the image data enters BRAID system step 810 for BRAID processing described above and also illustrated in FIG. 7. If the image is determined to be an image other than the first image in a series of images, the image data proceeds to step 810 where the BRAID update system processes the image data according to the BRAID updating method.

The processed data proceeds to step 812 where it is determined whether the image data being processed is from the last image in a series of images or video based on frame information provided by the BRAID system step 810. If the image data is not from the last image in a series of images, the processed image data is fed to the panel 814 and the portion of the display corresponding to the BRAID line group being processed is updated with the image data. If the image data is from the last image in a series of images, upon completion of processing the last image, step 816 is used to apply a waveform to the display for cleaning up any artifacts such as ghosting or blooming that may be present after the update. For example, a GLR waveform (e.g., a global limited waveform modified based on E Ink's Regal algorithm) can be used on the static last image to clean up artifacts. In some embodiments, step 816 applies the GLR waveform to the display after all of the image data for the last image has been processed and sent to the display panel 814.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method for driving an electro-optic display comprising a layer of electro-optic material disposed between a common electrode and a backplane, the backplane including an array of pixel electrodes, wherein each pixel electrode is coupled to a pixel transistor, wherein a display controller circuit applies waveforms to the array of pixel electrodes by applying one or more time-dependent voltages between the common electrode and the array of pixel electrodes via the pixel transistors, the method for driving comprising:

apportioning a displayable region of the electro-optic display into N BRAID line groups, wherein each of the N BRAID line groups is associated with a frame buffer;

receiving first image data comprising optical state data for the entire displayable region of the electro-optic display;

sequentially writing subsets of the first image data to each of the N frame buffers, wherein each of the N frame buffers is written with data corresponding to the corresponding BRAID line group;

sequentially updating portions of the displayable region of the electro-optic display based on the data in each of the N frame buffers;

receiving second image data comprising optical state data for the entire displayable region of the electro-optic display;

sequentially writing subsets of the second image data to each of the N frame buffers, wherein each of the N frame buffers is written with data corresponding to the corresponding BRAID line group, and wherein the subsets of the first image data in each of the N frame buffers are overwritten by the subsets of the second image data after the portion of the displayable region is updated based on the subsets of the first image data in each of the N frame buffers; and sequentially updating portions of the displayable region of the electro-optic display based on the subsets of the second image data in each of the N frame buffers, wherein subsets of the second image data are presented on the electro-optic display while subsets of the first image data are presented on the electro-optic display.

2. The method of claim 1 wherein each of the N BRAID line groups corresponds to a plurality of rows of display pixels from the array of pixel electrodes.

3. The method of claim 1 further comprising selecting a drive scheme for updating the displayable region of the electro-optic display.

4. The method of claim 3 wherein the drive scheme selected for updating the displayable region of the electro-optic display is a direct update drive scheme.

5. The method of claim 1 wherein the first image data has an image size, and each of the N frame buffers comprises sufficient memory to store a portion of the first image data corresponding to the image size divided by N.

6. The method of claim 1 wherein the displayable region of the electro-optic display is apportioned into two BRAID line groups.

7. The method of claim 1 wherein the displayable region of the electro-optic display is apportioned into three BRAID line groups.

8. The method of claim 1 further comprising updating the displayable region of the electro-optic display using a driving scheme configured to remove image artifacts after updating the displayable region of the electro-optic display based on last image data.

9. The method of claim 1 further comprising dithering the first image data to convert the image data to 1-bit image data.

10. The method of claim 1 further comprising:
receiving third image data comprising optical state data for the entire displayable region of the electro-optic display;
sequentially writing subsets of the third image data to each of the N frame buffers, wherein each of the N frame buffers is written with data corresponding to the corresponding BRAID line group, and wherein the subsets of the first image data and the second image data in each of the N frame buffers are overwritten by the subsets of the third image data after the portion of the displayable region is updated based on the subsets of the first image data and the second image data in each of the N frame buffers; and
sequentially updating portions of the displayable region of the electro-optic display based on the subsets of the third image data in each of the N frame buffers,
wherein subsets of the third image data are presented on the electro-optic display while subsets of the first image data and subsets of the second image data are presented on the electro-optic display.

* * * * *